(12) United States Patent
Gaigg et al.

(10) Patent No.: US 11,637,337 B2
(45) Date of Patent: *Apr. 25, 2023

(54) ACCUMULATOR

(71) Applicant: Miba eMobility GmbH, Laakirchen (AT)

(72) Inventors: Stefan Gaigg, Gmunden (AT); Roland Hintringer, Linz (AT)

(73) Assignee: Miba eMobility GmbH, Laakirchen (AT)

( * ) Notice: Subject to any disclaimer, the term of this patent is extended or adjusted under 35 U.S.C. 154(b) by 171 days.

This patent is subject to a terminal disclaimer.

(21) Appl. No.: 16/638,929

(22) PCT Filed: Sep. 11, 2018

(86) PCT No.: PCT/AT2018/060205
§ 371 (c)(1),
(2) Date: Feb. 13, 2020

(87) PCT Pub. No.: WO2019/051520
PCT Pub. Date: Mar. 21, 2019

(65) Prior Publication Data
US 2020/0227800 A1    Jul. 16, 2020

(30) Foreign Application Priority Data
Sep. 14, 2017   (AT) .............................. A 50771/2017

(51) Int. Cl.
*H01M 10/6554* (2014.01)
*H01M 10/617* (2014.01)
(Continued)

(52) U.S. Cl.
CPC ...... *H01M 10/6554* (2015.04); *H01M 10/482* (2013.01); *H01M 10/486* (2013.01);
(Continued)

(58) Field of Classification Search
CPC ........... H01M 10/6554; H01M 10/613; H01M 10/615; H01M 10/617; H01M 10/6556;
(Continued)

(56) References Cited

U.S. PATENT DOCUMENTS 7,291,420 B2   11/2007   Bitsche et al.
8,852,772 B2   10/2014   McDonald
(Continued)

FOREIGN PATENT DOCUMENTS

CN   1745438 A    3/2006
CN   102906933 A  * 1/2013   .............. B23P 19/04
(Continued)

OTHER PUBLICATIONS

International Search Report in PCT/AT2018/060205, dated Feb. 4, 2019.
(Continued)

*Primary Examiner* — Kaity V Chandler
(74) *Attorney, Agent, or Firm* — Collard & Roe, P.C.

(57) ABSTRACT

The invention relates to rechargeable battery (1) having at least one cell (3) for storing electrical energy and at least one heating device (2) for heating or controlling the temperature of the cell (3), said heating device (2) comprising a single-layer or multi-layer film (4, 9) with at least one heating element.

8 Claims, 2 Drawing Sheets

(51) Int. Cl.
*H01M 10/613* (2014.01)
*H01M 10/615* (2014.01)
*H01M 10/6568* (2014.01)
*H01M 10/6556* (2014.01)
*H01M 10/48* (2006.01)

(52) U.S. Cl.
CPC ....... *H01M 10/613* (2015.04); *H01M 10/615* (2015.04); *H01M 10/617* (2015.04); *H01M 10/6556* (2015.04); *H01M 10/6568* (2015.04)

(58) Field of Classification Search
CPC .......... H01M 10/6568; H01M 10/482; H01M 10/486; H01M 10/625; H01M 10/637; H01M 10/647; H01M 10/657; H01M 2220/20; Y02E 60/10
See application file for complete search history.

(56) References Cited

U.S. PATENT DOCUMENTS

| | | | |
|---|---|---|---|
| 8,889,282 B2 | 11/2014 | Goesmann et al. | |
| 8,962,172 B2 | 2/2015 | Bolze et al. | |
| 9,546,827 B2 | 1/2017 | Ludwig et al. | |
| 9,559,387 B2 | 1/2017 | Obrist et al. | |
| 2002/0177035 A1 | 11/2002 | Oweis et al. | |
| 2004/0004461 A1* | 1/2004 | Hamada | H01M 10/613 320/112 |
| 2005/0089750 A1* | 4/2005 | Ng | H01M 10/647 429/120 |
| 2007/0037050 A1 | 2/2007 | Rigobert et al. | |
| 2008/0179315 A1 | 7/2008 | Suzuki et al. | |
| 2008/0311468 A1 | 12/2008 | Hermann et al. | |
| 2011/0304297 A1 | 12/2011 | Sohn | |
| 2012/0021270 A1* | 1/2012 | Kumar | H01M 10/647 429/120 |
| 2012/0107635 A1 | 5/2012 | Hirsch et al. | |
| 2012/0231313 A1 | 9/2012 | Kumar et al. | |
| 2013/0122331 A1 | 5/2013 | McDonald | |
| 2015/0221992 A1* | 8/2015 | Bober | H01M 10/6571 429/90 |
| 2015/0295287 A1* | 10/2015 | Schnaars | H01M 10/625 165/80.4 |
| 2016/0233561 A1 | 8/2016 | Lee | |
| 2016/0233564 A1 | 8/2016 | Rinker et al. | |
| 2017/0104252 A1 | 4/2017 | Wuensche et al. | |
| 2017/0200926 A1 | 7/2017 | Motokawa et al. | |
| 2017/0338532 A1 | 11/2017 | Mott et al. | |
| 2018/0151929 A1 | 5/2018 | Song et al. | |
| 2018/0238632 A1 | 8/2018 | Jia et al. | |

FOREIGN PATENT DOCUMENTS

| | | | |
|---|---|---|---|
| CN | 206 353 596 U | 7/2017 | |
| DE | 9012327 U1 | 11/1990 | |
| DE | 100 34 134 A1 | 1/2002 | |
| DE | 10 2008 053 311 A1 | 4/2009 | |
| DE | 10 2008 034 867 A1 | 1/2010 | |
| DE | 10 2008 059 970 A1 | 6/2010 | |
| DE | 10 2010 032 460 A1 | 2/2012 | |
| DE | 10 2011 075 820 A1 | 11/2012 | |
| DE | 10 2011 118 686 A1 | 5/2013 | |
| DE | 10 2013 220 044 A1 | 4/2015 | |
| DE | 10 2013 221 747 A1 | 4/2015 | |
| DE | 10 2013 021 553 A1 | 6/2015 | |
| DE | 10 2015 204 678 A1 | 9/2016 | |
| EP | 1 261 065 A2 | 11/2002 | |
| EP | 2 451 004 A1 | 5/2012 | |
| EP | 2 744 033 A1 | 6/2014 | |
| FR | 2 782 399 A1 | 2/2000 | |
| FR | 3013515 A1 | 5/2015 | |
| JP | 2006-271063 A | 10/2006 | |
| JP | 2014-078471 A | 5/2014 | |
| WO | 2010/012341 A1 | 2/2010 | |
| WO | 2010/108885 A1 | 9/2010 | |
| WO | 2011/088997 A1 | 7/2011 | |
| WO | 2012/062644 A1 | 5/2012 | |
| WO | 2012/072348 A1 | 6/2012 | |
| WO | 2017/015826 A1 | 2/2017 | |
| WO | WO-2017108581 A1 * | 6/2017 | ........ H01M 10/6563 |

OTHER PUBLICATIONS

International Search Report in PCT/AT2018/060190, dated Nov. 29, 2018.
International Search Report in PCT/AT2018/060204, dated Feb. 4, 2019.

* cited by examiner

ACCUMULATOR

CROSS REFERENCE TO RELATED APPLICATIONS

This application is the National Stage of PCT/AT2018/060205 filed on Sep. 11, 2018, which claims priority under 35 U.S.C. § 119 of Austrian Application No. A 50771/2017 filed on Sep. 14, 2017, the disclosure of which is incorporated by reference. The international application under PCT article 21(2) was not published in English.

BACKGROUND OF THE INVENTION

1. Field of the Invention

The invention relates to a rechargeable battery having at least one cell for storing electrical energy and at least one heating device for heating or controlling the temperature of the cell.

2. Description of the Related Art

The service life and effectiveness as well as the safety of a rechargeable battery, i.e. of an accumulator, for e-mobility depend, among other factors, on the temperature during operation. In this respect, a problem inter alia consists in starting a vehicle with a cold rechargeable battery, as often happens when starting in winter. For this reason, concepts were suggested in which the rechargeable battery is heated prior to starting in order to carry out the so-called cold start as closely as possible to the optimum operating temperature of the rechargeable battery. However, temperature control can also be required during operation of the rechargeable battery.

SUMMARY OF THE INVENTION

The present invention is based on the object of providing a constructively easy possibly by means of which a rechargeable battery can be heated and/or its temperature can be controlled.

In the aforementioned rechargeable battery, the object of the invention is achieved in that the heating device comprises at least one single-layer or multi-layer film with at least one heating element.

The advantage of this is that by the combination "film" with "heating element", the heating element can better rest against the cells, since the film can easier balance tolerances of the cells. Thus, the film can, without further measures (such as the application of leveling compounds) having to be implemented, lie against the cells with a larger surface, which thus allows for an improvement of the heat transmission from the heating element to the cells. Moreover, the film provides an easy possibility to arrange the heating element on the cell such that the further fastening for the heating element itself can optionally be dispensed with.

According to an embodiment variant of the rechargeable battery, it can be provided for that the heating element is formed as a metal film or a metalized plastic film or a wire or a grid. Such heating elements can be easily arranged on or in the film, whereby a further constructive simplification of the heating device can be achieved.

It can also be provided for that heating elements are arranged on or in the single-layer or multi-layer film. Hence, it is possible to further adapt the heat energy that can be transferred to the cells per time unit optionally by using the film as a delay element or insulating element or by making the transfer of heat energy to the cells more direct. In further consequence, hence, controlling the temperature of the cells can more easily be adapted to the respective cells such that a heating element type can more easily be used for different types of cells. Besides this, by arranging the heating element in the single-layer or multi-layer film, a protective function for the heating element can be easily realized as well.

According to another embodiment variant of the rechargeable battery, it can be provided for that the heating device is a part of a cooling device, wherein the at least one single-layer or multi-layer film at least partly forms a coolant channel. By means of this combination of the heating element with the cooling device, the constructive effort can be further simplified. Moreover, hence, heat energy can be fed into the coolant, whereby the temperature control of the cells during operation can be facilitated.

In order to achieve the most uniform heating of all cells possible, according to a further embodiment variant of the rechargeable battery it can be provided for that the heating element has an area of at least 90% of the base area of the cooling device. The heating element can thus be dimensioned relatively large.

According to another embodiment variant of the rechargeable battery, it can be provided for that the single-layer or multi-layer film comprises a separate heating element for each cell, whereby it can easily be allowed for that each cell can be detected, heated and/or temperature-controlled individually.

However, according to another embodiment variant of the rechargeable battery, it can also be provided for that the multi-layer film comprises at least two plastic films and that the at least one heating element is arranged between these two plastic films. The heating element can hence be designed to be more robust since it can be better protected from environmental impacts.

It can further be provided for that the single-layer or multi-layer film comprises at least one temperature sensor, which is connected to the heating element, such that the heating performance of the heating element is controlled depending on the measured value of the temperature. Hence, a more precise temperature control of the rechargeable battery to a temperature within a narrower temperature interval can be achieved.

According to a further development, it can be provided for that the at least one temperature sensor rests directly against the cell, whereby the temperature measurement can be carried out more precisely and, moreover, temperature changes within the cell can be reacted to more quickly.

BRIEF DESCRIPTION OF THE DRAWINGS

For the purpose of better understanding of the invention, it will be elucidated in more detail by means of the figures below.

These respectively show in a simplified schematic representation.

DETAILED DESCRIPTION OF THE PREFERRED EMBODIMENTS

First of all, it is to be noted that in the different embodiments described, equal parts are provided with equal reference numbers and/or equal component designations, where the disclosures contained in the entire description may be analogously transferred to equal parts with equal reference numbers and/or equal component designations. Moreover, the specifications of location, such as at the top, at the bottom, at the side, chosen in the description refer to the directly described and depicted figure and in case of a change of position, these specifications of location are to be analogously transferred to the new position.

Figure 1:
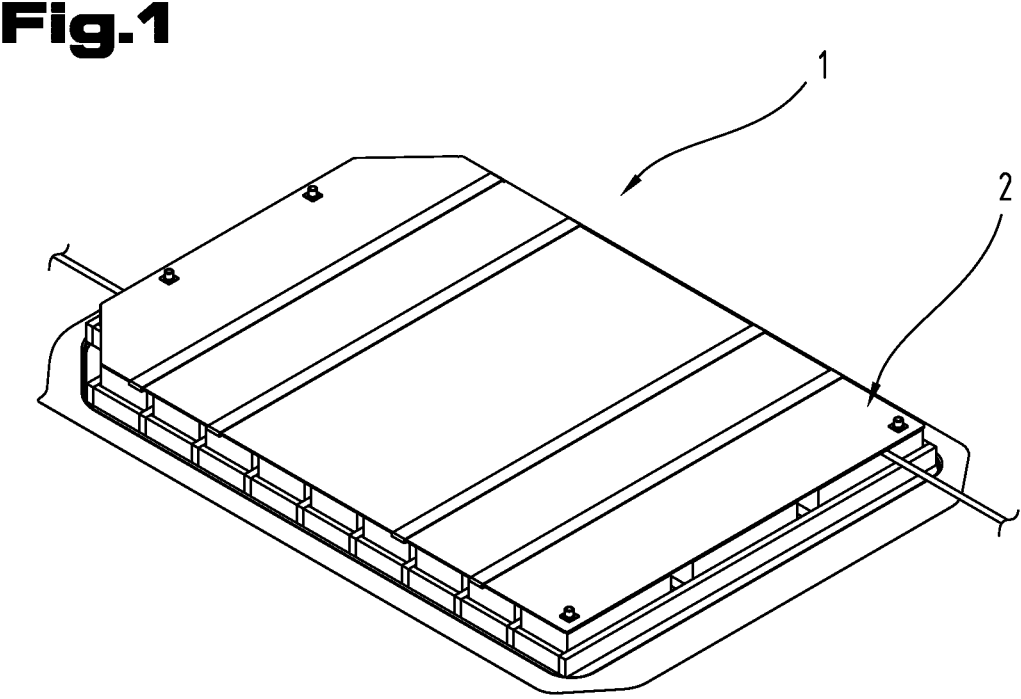
FIG. 1 a rechargeable battery in an oblique view with a heating device.
Figure 2:
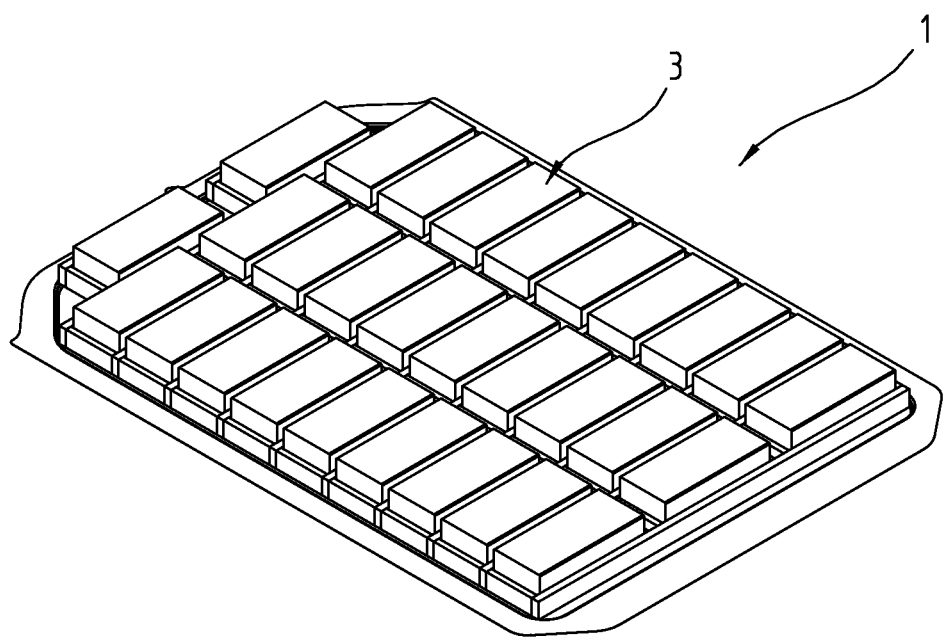
FIG. 2 the rechargeable battery according to FIG. 1 in an oblique view without the heating device.

FIGS. 1 and 2 show a rechargeable battery 1, i.e. an accumulator, in an oblique view, with FIG. 1 showing the rechargeable battery 1 with a heating device 2 and FIG. 2 showing the rechargeable battery 1 without this heating device 2.

The rechargeable battery 1 comprises several cells 3 for electrical energy. In the represented example there are 27 cells 3. However, this number is not to be considered restricting.

The cells 3 can be formed to be cuboid, cube-shaped, cylindrical, etc.

As the basic construction of such rechargeable batteries 1 for e-mobility is known from the prior art, reference is made thereto so as to avoid repetitions.

As can be seen from the comparison of the two FIGS. 1 and 2, the heating device 2 is arranged on a side of the rechargeable battery 1, in particular on the top. However, it can also be provided for that the heating device 2 extends across at least two surfaces of the rechargeable battery 1, for example on the top and laterally and optionally on the bottom. In the alternative or in addition to this, the heating device 2 can also be arranged between the cells 3.

It is preferred if the heating device 2 extends across all cells 3, in particular the upper side of the cells 3, (as can be seen from FIG. 1) such that all cells 3 can be heated or their temperature can be controlled by means of just one heating device 2. However, in general, it is also possible to provide several heating devices 2 in the rechargeable battery 1, for example two or three or four, such that for example the cells 3 are distributed to two or three or four, etc. heating devices 2.

Reference is made to the fact that the terms upper side etc. refer to the installation position of the rechargeable battery 1.

Further reference is made to the fact that the cells 3 can be formed modularly such that these can also be referred to as storage modules.

Moreover, reference is made to the fact that in the present description, the rechargeable battery 1 is described with several cells 3. However, the rechargeable battery 1 can also comprise merely one cell 3 such that the statements in the description can be correspondingly applied to this embodiment variant.

Figure 3:
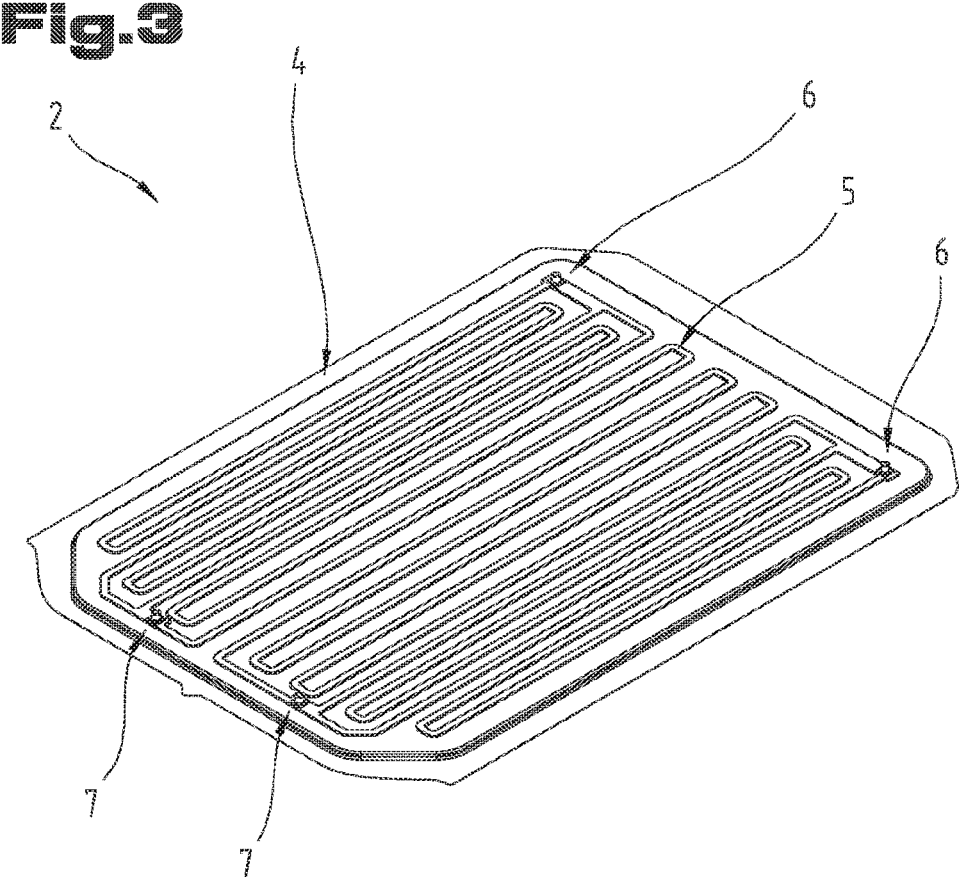
FIG. 3 a cutout from a cooling device for the rechargeable battery.
Figure 4:
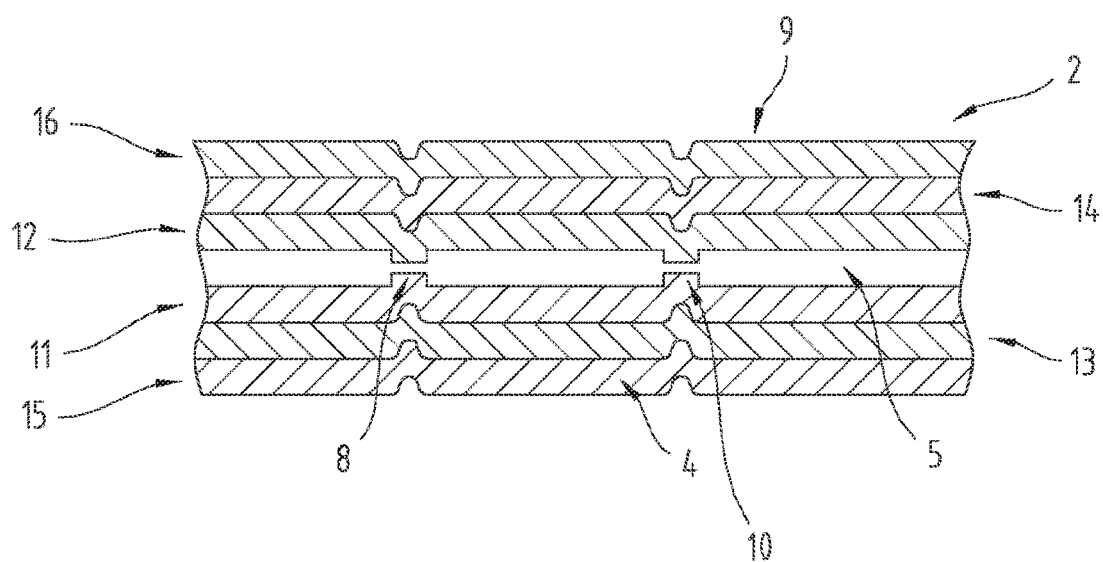
FIG. 4 a cutout from the heating device in combination with a cooling device of the rechargeable battery.

In all embodiment variants, the heating device 2 comprises a single-layer or multi-layer film 4 or consists thereof, as can be seen from FIGS. 3 and 4. By means of this film 4, the heating device 2, in particular directly, lies against cells 3. The contact is for example established at the upper side of the cells 3, as was elucidated above. As the film 4 is flexible, i.e. not stiff, said film 4 can better adapt to surface irregularities of the cells 3 or between the cells 3. A leveling compound between the heating device 2 and the cells 3 is not required.

The heating device 2 can comprise the and/or a single-layer or multi-layer film 4 on both sides. However, it is also possible that the single-layer or multi-layer film 4 is arranged merely on the side of the heating device 2 that faces the cells 3, and that this film 4 is combined with a stiff metal layer, for example of aluminum and/or an aluminum alloy, which can also form a cover of the rechargeable battery 1.

Moreover, the heating device 2 can comprise a cooling device with at least one coolant channel 5, which extends from at least one inlet 6 to at least one outlet 7. The at least one coolant channel 5 can be formed within the single-layer or multi-layer film 4 or between two single-layer or multi-layer films 4 or between this film 4 and the metal layer by a just partial connection of the film(s) 4 or of the film 4 to the metal layer, as can be seen in FIG. 4. For example, the at least one coolant channel 5 can be produced by bonding or welding of the film(s) 4 forming webs 8 (FIG. 4). In this regard, the at least one coolant channel 5 emerges in the non-connected regions of the film(s) 4 next to the webs 8. Other suitable connecting techniques can also be used for connecting the film(s) 4 or the film 4 to the metal layer.

The at least one coolant channel 5 can also be produced differently. For example, the metal layer can be reformed, e.g. deep-drawn, accordingly.

The coolant channel 5 can be formed to extend in a meandering manner in the heating device 2, as can be seen from FIG. 3. The concrete representation of the extent of the at least one coolant channel 5 in FIG. 3 is to be understood merely as an example. The respectively optimized extent of the at least one coolant channel 5 is among other factors determined by the amount of heat that needs to be conducted away, the geometry of the rechargeable battery 1, etc. It can also be provided for that more than one coolant channel 5 is formed and/or arranged in the heating device 2. In this case, it is advantageous if a common inlet 6 is arranged in front of the several coolant channels 5 and a common outlet 7 behind them, which can each be formed as collecting channels, from which the coolant channels 5 branch out or into which they flow. However, it is also possible that each coolant channel 5 has its own inlet 6 and/or its own outlet 7.

In particular, a liquid such as a water-glycol mixture is used as the coolant by which the cooling device is flown through.

The heating device 2 according to FIG. 4 comprises the film 4 and a further single-layer or multi-layer film 9. The film 4 and the further film 9 are connected to one another in connection areas 10 forming the at least one coolant channel 5 between the film 4 and the further film 9. The connection areas 10 extend along the longitudinal extent of the at least one coolant channel 5, wherein between the connection areas 10 non-connected areas remain in which the at least one coolant channel 5 is formed by the distancing of the film 4 with respect to the further film 9. The film 4 and the further film 9, which is in particular arranged above the film 4, extend across a surface which preferably at least approximately, in particular to 100%, corresponds to the surface of the connection area 10 (as viewed in a plan view).

The film 4 and the further film 9 can consist of a laminate comprising a first plastic film 11, 12, optionally an enforcement layer 13, 14 connected thereto, a plastic film 11, 12 or a metal film 15 and/or 16 connected to the enforcement layer 13 and/or 14 or a metalized further plastic film connected to the enforcement layer 13. However, it should be noted that in particular the film 4 resting against the cells 3 can also be formed from the plastic film 11 as a single layer.

In general, other laminates can be used as well. For example, merely the film 4 can be provided with the metal film 15 or merely the further film 9 can be provided with the metal film 16. Likewise, merely the film 4 can comprise the enforcement layer 13 or merely the further film 9 can comprise the enforcement layer 14. Likewise, structures of the film 4 and/or the further film 9 with more than three layers are possible. However, preferably, the film 4 and the further film 9 are designed equally.

The at least one coolant channel 5 is not formed by separate components but by the just partial connection of the film 4 to the further film 9. The wall and/or the walls of the at least one coolant channel 5 are thus formed by the film 4 and the further film 9, preferably half by each.

The first plastic films 11, 12 and/or the metalized further plastic film preferably consists/consist to at least 80 wt. %, in particular at least 90 wt. %, of a thermoplastic material or of an elastomer. The thermoplastic material can be selected from a group comprising and/or consisting of polyethylene (PE), polyoxymethylene (POM), polyamide (PA), in particular PA 6, PA 66, PA 11, PA 12, PA 610, PA 612, polyphenylene sulphide (PPS), polyethylene terephthalate (PET), crosslinked polyolefins, preferably polypropylene (PP). The elastomer can be selected from a group comprising and/or consisting of thermoplastic elastomers such as thermoplastic vulcanizates, olefin-, amine-, ester-based thermoplastic polyurethanes, in particular ether-based/ester-based thermoplastic elastomers, styrene block copolymers, silicone elastomers.

At this point, it should be noted that the term plastic material is understood as a synthetic or natural polymer produced from corresponding monomers.

Preferably, the first plastic film 11, 12 and/or the metalized further plastic film consists/consist of a so-called sealing film. This has the advantage that the respective films can be connected to one another directly.

However, it is also possible to use other plastic materials, such as thermosetting plastic materials and/or thermosetting materials, which are then for example adhered to one another by means of an adhesive. Two-part adhesive systems based on polyurethane or silicone or hot melt adhesive systems are particularly suitable for this purpose.

Preferably, the enforcement layer/enforcement layers 13, 14 comprise/comprises a or consist/consists of a fiber reinforcement which is preferably formed as a separate layer. The fiber reinforcement can be formed of fibers and/or threads, which are selected from a group comprising or consisting of glass fibers, aramid fibers, carbon fibers, mineral fibers such as basalt fibers, natural fibers such as hemp, sisal and combinations thereof.

Preferably, glass fibers are used as fiber reinforcement. The proportion of the fibers, in particular the glass fibers, in the fiber reinforcement can amount to at least 80 wt. %, in particular at least 90 wt. %. Preferably, the fibers and/or threads of the fiber reinforcement consist merely of glass fibers.

The fibers and/or threads can be present in the fiber reinforcement as roving, for example as a non-woven fabric. However, preferably the fibers and/or threads become a woven fabric or a knitted fabric. In this regard, it is also possible that the woven or knitted fabric is merely present in some regions and that the remaining regions of the fiber reinforcement are formed by a roving.

It is also possible that rubberized fibers and/or threads are used as or for the fiber reinforcement.

When using a woven fabric, different types of weaves are possible, in particular plain, twill or satin weave. Preferably, a plain weave is used.

However, it is also possible to use an open-mesh glass fabric or glass roving.

Coated paper can also be used as fiber reinforcement. The paper is equipped to be resistant to liquids by the coating.

In the alternative or in addition to the fiber reinforcement, the enforcement layer(s) 13, 14 can comprise a mineral filling. For example, calcium carbonate, talc, quartz, wollastonite, kaolin or mica can be used as a mineral filling (mineral filler material).

The metal film 15, 16 in particular is an aluminum film. However, other materials such as copper or silver can also be used.

The metal film 15, 16 can have a layer thickness of between 5 µm and 200 µm in particular of between 60 µm and 200 µm.

The plastic films 11, 12 can have a layer thickness of between 10 µm and 200 µm.

The layer thickness of the enforcement layer(s) 13, 14 can amount to between 5 µm and 50 µm.

Although the films 4, 9 can in general be used in the form of individual films for producing the cooling device 2, such that the film laminate(s) are only formed in the course of the production of the cooling device, it is advantageous if the films 4, 9 are used as a (laminated) semi-finished product.

For connecting the individual layers of the laminate or the laminates, these can be adhered to one another by means of adhesives. The afore-mentioned adhesives are suitable for this purpose. Besides adhesives, coextrusion and extrusion coating can also be used as joining options. Of course, a combination is also possible in which several plastic materials are coextruded and adhesively laminated to one another with an extrusion-coated metal or (fiber) enforcement layer. In general, all known methods can be used for producing composite films and/or film laminates.

The heating device 2 can also comprise a further single-layer or multi-layer film, whereby coolant channels 5 can be formed in several planes.

However, explicit reference is made to the fact that the heating device 2 can also be designed without these coolant channels 5, i.e. merely comprise the single-layer or multi-layer film 4. Moreover, it is possible that the rechargeable battery 1 comprises a separate cooling device, which can in particular also be produced from the single-layer or multi-layer films 4, 9, as was described above. However, the described combination of the heating device 2 with the cooling device is preferred.

The heating device 2 comprises at least one heating element. In the embodiment variant of the rechargeable battery 1 described above, the at least one heating element is formed by the metal film 15 and/or the metal film 16 and/or the metalized plastic film.

The at least one heating element can, however, be designed differently, in particular as a wire or as a grid. In this regard, the term "grid" also comprises woven fabrics with open mashes (mesh fabrics). Such heating elements are preferably formed from metal.

However, in general, the heating element can also comprise a non-metal carrier with an electrically conductive coating. Such coatings can, for example, be lacquer-based, as known from Coating Suiss GmbH in the form of carbon-based heating lacquers.

In addition or in the alternative to the afore-described arrangement of the at least one heating element (in the form of the metal film 15, 16) between two layers of the film 4, 9, for example between two plastic films 11, 12, it can also be arranged on the single-layer or multi-layer film 4, 9, for example on the plastic film 11, 12. The arrangement can for example be carried out by lamination or bonding.

Moreover, the at least heating element can also be arranged with a layer of the single-layer or multi-layer film 4, 9 by the heating element being already provided during formation of this layer and being enclosed by and/or embedded in the material of this layer.

In case of the at least one heating element being arranged between two layers and/or two plastic films 11, 12 of the multi-layer film 4, 9, the two layers and/or plastic films 11, 12 in particular rest directly against the at least one heating element and/or are directly connected thereto.

The at least one heating element comprises an area and/or circumscribes an area which comprises at least 90%, in particular 100%, of the base area of the film 4, 9 or of the cooling device. In this regard, the term "circumscribe" is to be understood with regard to the grid-shaped heating element.

The heating element can continuously extend across the entire surface area of the single-layer or multi-layer films 4, 9. However, it can also be provided for that the heating device 2 comprises several heating elements and that a separate heating element is assigned to each cell 3.

It is clear from the aforesaid that the at least one heating element and/or the heating elements are electrically contacted, i.e. are resistance heating elements. The electrical contacting can be established via a wiring (shown in FIG. 1) or via conducting paths. The conducting path(s) can for example be deposited on the single-layer or multi-layer film 4, 9 and/or on a layer thereof by means of thin film technology.

Moreover, the single-layer or multi-layer film can comprise at least one temperature sensor, which is connected to the at least one heating element, such that the heating performance of the heating element is controlled depending on the measured value of the temperature. The connection between the heating element and the temperature sensor can be established via an open loop controller and/or a closed loop controller.

Preferably, at least one temperature sensor is assigned to each cell 3, meaning that each cell 3 has a separate temperature sensor.

Like the heating element, the at least one temperature sensor can also be arranged on or in the film 4, 9 or within a layer of the film 4, 9. Moreover, the at least one temperature sensor can also be produced by means of thin film technology and preferably be contacted to be electrically conductive by means of one or several conducting path(s), wherein the conductive path(s) can be deposited on a layer of the film 4, 9.

"Arranged on the film" means that the respective component is arranged on an outside, i.e. on an outer surface, of the single-layer or multi-layer film 4.

It is further preferred for the at least one temperature sensor to be a thin layer sensor element.

The at least one temperature sensor can for example be a thermocouple or a thermistor. In general, other suitable temperature sensors can be used as well.

The temperature sensor can comprise a negative temperature coefficient thermistor (NTC) or a positive temperature coefficient thermistor (PTC).

In the preferred embodiment variant, the heating device 2 is used for heating and/or controlling the temperature of a rechargeable battery 1. However, other applications of the heating device to 2 are also possible. The heating device 2 can thus represent a separate invention on its own, i.e. without the cells 3 and the rechargeable battery 1. Therefore, the statements regarding the heating device 2 made above also apply to this separate invention.

The exemplary embodiments show and/or describe possible embodiment variants, while combinations of the individual embodiment variants are also possible.

Finally, as a matter of form, it should be noted that for ease of understanding of the structure of the rechargeable battery 1 and/or of the heating device 2, these are not obligatorily depicted to scale.

LIST OF REFERENCE NUMBERS

1 rechargeable battery
2 heating device
3 cell
4 film
5 coolant channel
6 inlet
7 outlet
8 web
9 film
10 connection areas
11 plastic film
12 plastic film
13 enforcement layer
14 enforcement layer
15 metal film
16 metal film

The invention claimed is:
1. A rechargeable battery comprising:
at least one cell for storing electrical energy and
at least one heating device comprises a flexible multi-layer film with an electrically contacted heating resistance element formed as a metal film or a metalizes plastic film or a wire or a grid,
wherein the heating device is a part of a cooling device,
wherein the multi-layer film of the heating device at least partly forms a coolant channel,
wherein the multi-layer film comprises a first plastic film, an enforcement layer connected to the first plastic film, and a metal film connected to the enforcement layer,
wherein the first plastic film has a layer thickness of between 10 μm and 200 μm, the enforcement layer has a layer thickness of between 5 μm and 50 μm, and the metal film has a layer thickness between 5 μm and 200 μm; and
wherein the multi-layer film further comprises at least a second plastic film and wherein the electrically contacted heating resistance element is arranged between the first and second plastic films.

2. The rechargeable battery according to claim 1, wherein the electrically contacted heating resistance element is arranged on or in the multi-layer film.

3. The rechargeable battery according to claim 1, wherein the electrically contacted heating resistance element has an area of at least 90% of a base area of the cooling device.

4. The rechargeable battery according to claim 1, wherein the multi-layer film comprises at least one separate electrically contacted heating resistance element for each cell.

5. The rechargeable battery according to claim 1, wherein the multi-layer film comprises at least one temperature sensor, which is connected to the electrically contacted heating resistance element, such that the heating performance of the electrically contacted heating resistance element is controlled depending on the measured value of the temperature.

6. The rechargeable battery according to claim 1, wherein the at least one temperature sensor rests directly against the cell.

7. The rechargeable battery according to claim 1, wherein the metal film of the multi-layer film forms the metal film of the electrically contacted heating resistance element.

8. The rechargeable battery according to claim 1, further comprising a stiff metal layer, wherein the multi-layer film is combined with the stuff metal layer to form a cover for the rechargeable battery.

* * * * *

UNITED STATES PATENT AND TRADEMARK OFFICE
CERTIFICATE OF CORRECTION

| | |
|---|---|
| PATENT NO. | : 11,637,337 B2 |
| APPLICATION NO. | : 16/638929 |
| DATED | : April 25, 2023 |
| INVENTOR(S) | : Gaigg et al. |

It is certified that error appears in the above-identified patent and that said Letters Patent is hereby corrected as shown below:

In the Claims

In Claim 1, Line 3 (Line 33 of Column 8), after "at least one heating device," please add -- for heating or controlling the temperature of the cell, wherein the heating device --.

Signed and Sealed this
Thirtieth Day of May, 2023

Katherine Kelly Vidal
*Director of the United States Patent and Trademark Office*